Sept. 15, 1964 R. A. HIGONNET ET AL 3,148,766
TYPE COMPOSING APPARATUS
Filed July 21, 1960 8 Sheets-Sheet 1

Sept. 15, 1964         R. A. HIGONNET ET AL         3,148,766
                      TYPE COMPOSING APPARATUS
Filed July 21, 1960                              8 Sheets-Sheet 2
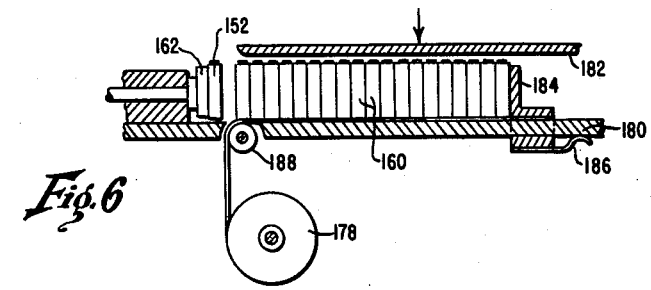
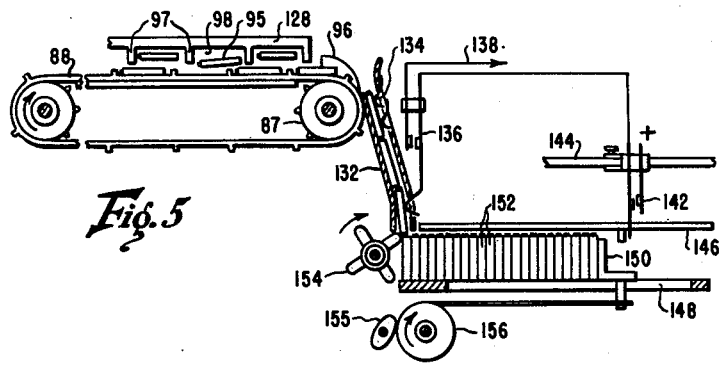
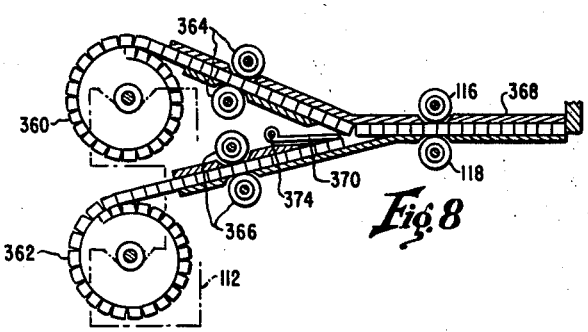
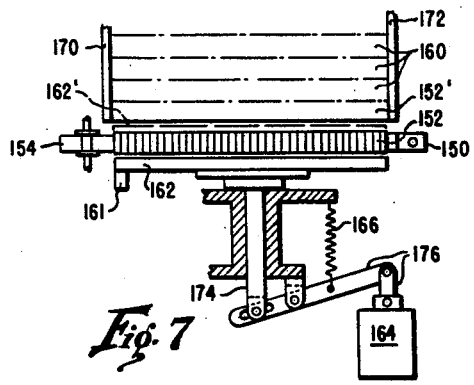

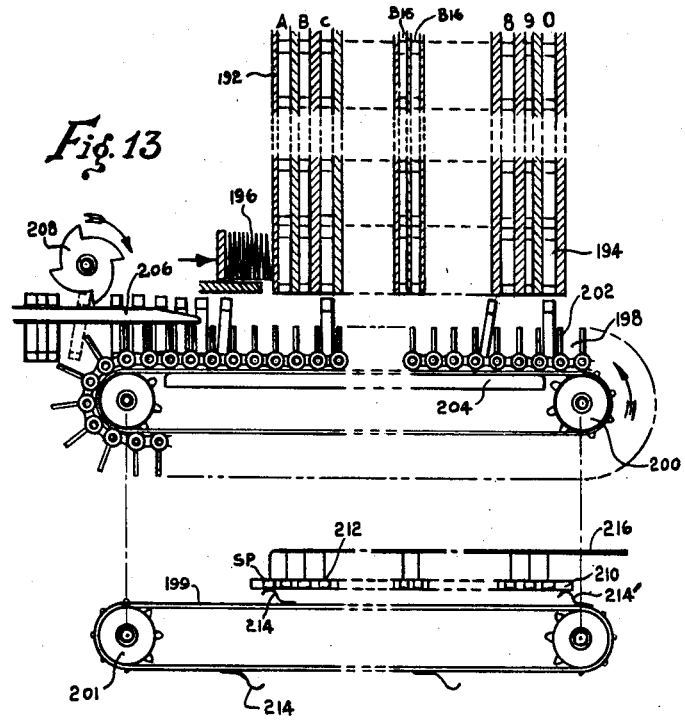
Fig. 13
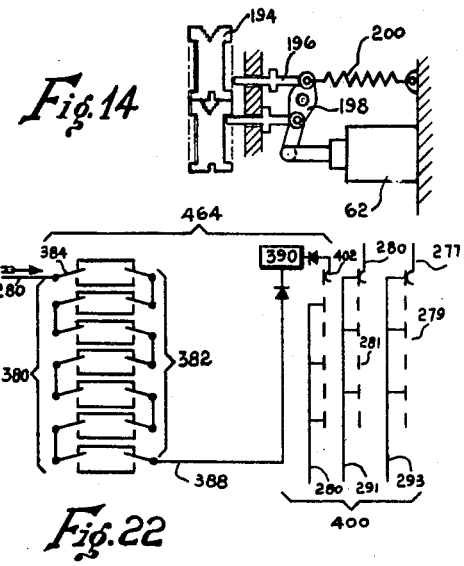
Fig. 14
Fig. 22

INVENTOR.
BY

United States Patent Office 3,148,766
Patented Sept. 15, 1964

3,148,766
TYPE COMPOSING APPARATUS
Rene A. Higonnet, Cambridge, and Louis M. Moyroud, West Medford, Mass. (both % Graphic Arts Research Foundation, Inc., 58 Charles St., Cambridge 41, Mass.)
Filed July 21, 1960, Ser. No. 44,306
21 Claims. (Cl. 199—18)

The present invention relates to typecomposing and linecasting machines.

An object of the invention is to provide novel means for assembling character-bearing matrices in linecasting machines.

Another object of the invention is to provide novel means to assemble individual character-bearing elements of varying widths to compose lines of type.

A further object of the invention is a tape controlled high speed composing machine.

A still further object of the invention is a machine composing lines with individual foundry type at a high speed with automatic justification means.

A still further object of the invention is a machine assembling individual foundry type in lines and galley form with means to maintain each individual type at its proper position at the output of the machine.

A still further object of the invention is a typographical composing machine assembling characters or character-bearing elements in line formation in an order which is different from the order at which said characters are read in the completed line.

In brief the invention contemplates the use of a number of type magazines disposed in a line, and a conveyor such as a belt which travels along beneath the line of magazines. The release of selected type bearing elements onto the belt is controlled by signals from a magnetic core memory representing characters (and justification indicia) in the line to be composed. In the core memory there is one core for each unique combination of a character, and character position in the line to be composed; the characters being identified in terms of positional relations to the other characters in the magazines, and the character positions being expressed in terms of instantaneous positional relations between the belt and the magazines. To select an individual core, a signal from a prepared tape with punches representing a character, and from a switching device having segments corresponding to longitudinal increments of the belt, are applied to the core simultaneously. By advancement of the tape and the switching device in synchronism with the movement of the belt, a plurality of cores are selected in this way and each is adapted to provide a signal specifying a character and its order of occurrence in the line to be composed. As the cores are sensed in synchronism with the movement of the belt in like manner as they are selected, it follows that the order in which the character signals are obtained from the core memory is properly determinative of the order in which character-bearing elements are released onto the belt.

According to another feature of the invention, the different characters of several lines are assembled in a continuous cycle at the end of each line.

Numerous other objects and advantages will be apparent from the following description, the accompanying drawings, and the appended claims.

Referring to the drawings, they are largely diagrammatic and simplified in order to enable the principles of the invention to be more readily understood.

In the drawings,

FIG. 5 shows the mechanism used to transfer lines of type in a preferred embodiment of the invention.

FIGS. 6 and 7 show how the lines are assembled into galley forms in this preferred embodiment.

FIG. 8 shows an arrangement used to keep a continuous supply of type in the channels of the machine.

FIGS. 13 and 14 show how the present invention can be applied to existing line casting machines to increase their speed.

FIG. 22 represents a circuit to control the release of successively identical type.

Figure 4:
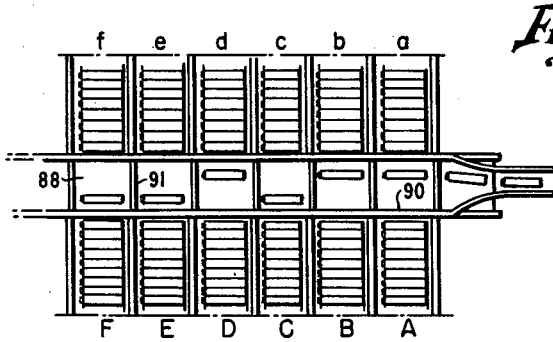
FIG. 4 shows schematically the conveyor belt and type magazines.

As shown in FIG. 4, the various type necessary for the composition of a line are located in channels or magazines such as shown at $a$, $b$, $c$, $d$, $e$, $f$ . . . A, B, C, D, E, F. There is one channel or magazine for each different character. These channels are arranged so that type can be ejected on a continuously moving belt 88. Each channel is provided with an escapement, not shown in FIG. 4, operating in such a way that one type or character and one only is allowed to escape from its channel each time an associated escapement solenoid is operated. The ejection of type is determined by a memory device which can consist of a preferred tape, a magnetic core matrix or any other means.

The rubber belt 88 moves continuously past the apertures of the channels aligned along the path of said belt which is provided with ribs 91 as shown in FIG. 4, spaced by a distance equal to the distance between two consecutive channels, said channels being all equally spaced. This distance is preferably substantially larger than the length of the pieces of type. Also the belt has longitudinal edge ribs 90.

Figure 17:
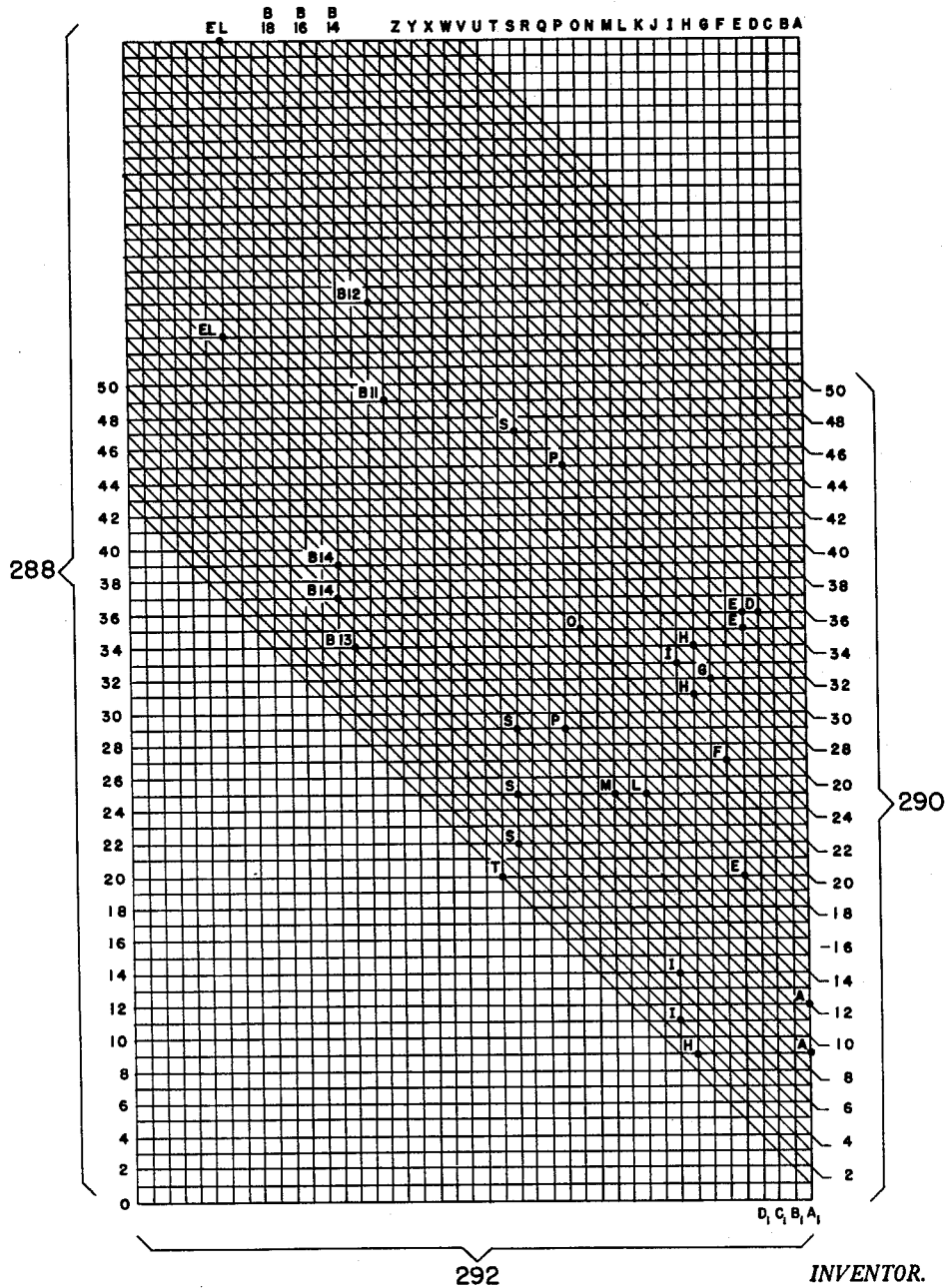
FIG. 17 represents schematically a magnetic core matrix used in one embodiment of the invention.

In the example shown, 50 channels are used for the lower case alphabet and 50 channels for the upper case alphabet, including various signs and spaces or blank characters used for justification purposes as will be explained later. According to the invention, the individual pieces of type are not ejected to the belt in the order at which they appear in the line. The order of their selection in point of time depends both on the location of the characters in the line from a given reference point and the location of the same characters in the type container starting, for example, from the first channel. As a complete alphabet comprising all the lower case and upper case letters plus the other various characters and spaces generally used in the printing art will, in most cases, be longer than the desired lines, more than one line will be composed at a time with pieces of type falling simultaneously for one, two, or three different lines. It should be clear that at this point several pieces of type may simultaneously be ejected from their respective channels during the composition of a line. In the example illustrated in FIG. 17 showing a preferred embodiment of the control circuit of the machine, it has been assumed that the following two lines are being composed; first line: "THIS IS A SAMPLE," second line "OF HIGH SPEED." In this case, the different pieces of type or characters will be ejected as follows: A and H simultaneously followed by I then A then I then E and T simultaneously, then S, then S and M simultaneously then L and F which belongs to the second line then S and P simultaneously which still belong to the first line and then the following characters which all belong to the second line, in order, H, G, I, justification space O, H and E simultaneously, E, D and justification space, justifying space, P, S, justifying space, justifying space. As the individual type have a very small distance to fall before hitting the belt and as there is practically no danger of transposition, it is evident that considerably higher speeds than in existing linecasting machines can be achieved with the present arrangement. Although the characters would seem to fall at random to an observer, they in fact are ejected according to an exact schedule as determined by the tape of FIGS. 11 and 12 or matrix of FIG. 17, or other kinds of controls performing an equivalent function. During the operation of the machine, each compartment, defined by the ribs of belt 88, emerging beyond the last channel of the machine in the direction of the motion of the belt should have its own character except for a number of empty spaces left between two consecutive identical characters in order to increase the average speed of the machine as will be explained later.

Figure 1:
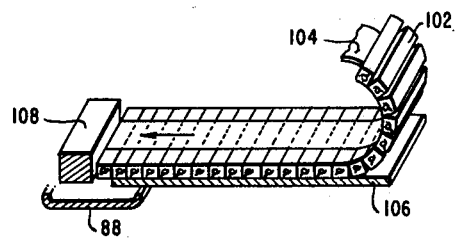
FIG. 1 shows preferred means to supply foundry type to the machine.
Figure 2:
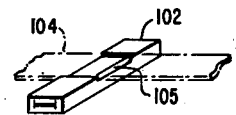
FIG. 2 shows a detail of a preferred form of foundry type.

In a preferred embodiment of the invention, type is not fed to the machine by magazines or tubes, as is known in the art, but rather through the use of a continuous "strip of type" as shown in FIG. 1. Each piece of type such as 102 is attached to a strip of pressure sensitive tape 104 preferably narrower than the height of type. This strip of tape can be automatically attached to each piece of type as it is ejected from the typecasting machine. Alternatively the strip of tape can be replaced by a film of plastic elastic material obtained by spraying this material in liquid form on the type when it is coming out of the casting machine. Each piece of type is preferably nicked as shown in FIG. 2. The purpose of the nick or recess 105 is to avoid damage to type when it is ejected by the ejection mechanism described later. A shallow groove can also be provided as shown, to receive the tape and avoid the effect of the tape thickness on the overall length of lines.

Figure 3:
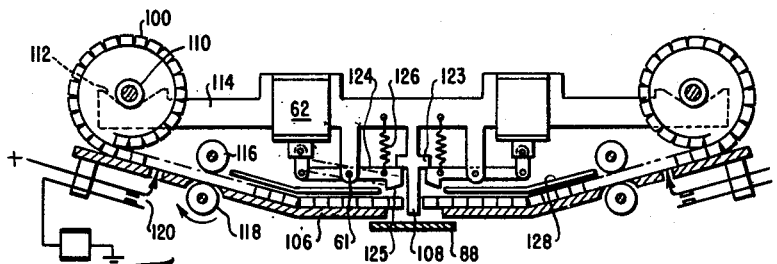
FIG. 3 shows a preferred embodiment of type feeding means.

The type is stored in rolled form as shown at 100 in FIG. 3. As the machine embodying the present invention can be run at high speed, above 30 characters per second or 110,000 characters per hour it is preferable, to have a large number of type of each sort and this is why the type in rolled form is preferred. For example, in a roll 45 inches in diameter as many as 40,000 eight-point letters "e" can be stored. Each roll is contained in a magazine not shown comprising a shaft 110 around which the strip of type is coiled. These shafts 110 are received in the machine in V blocks 112 integral with the general frame of the machine 114. Each strip of type slides between base plate 106 and guide plate 128. The first character of each strip is pressed against a stop 108 which is part of the frame of the machine by a set of rollers 118–116. Roller 116 is free to rotate on its shaft but is slightly pressed against the strip of type by means not shown. Roller 118 is continuously urged to rotate in the direction shown by the arrow through a friction mechanism not shown in order to feed the strip of type after each ejection. Additional means may be used to prevent the rolls of type from unwinding too fast under the action of these rollers after the ejection of each piece of type. A contact arrangement 120 is provided to give a signal to a circuit 122 which can stop the machine and signal the operator whenever one of the coils of type has been used up. As shown in FIG. 3, we use preferably a set of coils on one side of belt 88 for lower case type and another set of coils on the other side for upper case type. Belt 88 is provided with shallow ribs 89 as shown in FIG. 4. The transfer of individual pieces of type in the correct sequence from their strip to belt 88 is obtained by the energization of solenoids such as 62, in FIG. 3. When energized, solenoid 62 rocks clockwise lever 124, pivoted at 61, against spring 126 to force the end 125 of said lever downwardly and thus severs the connecting strip of plastic material and at the same time force the type down on the belt. As soon as solenoid 62 is deenergized and lever 124 pushed back against shoulder 123 under the action of spring 126, the feed rollers 118, 116 pull the strip forward to bring the next character against stop 108. The escapement solenoids 62 are preferably energized slightly before the recess which is to receive the type is exactly opposite the channel of said type. It may happen with this procedure that a piece of type falls too soon as shown at 95, FIG. 5, but also as shown in this figure this is not detrimental to the proper operation of the machine as would be the case if the type were to fall too late.

FIG. 5 shows how type is assembled in this preferred embodiment of the invention. As the continuously moving belt 88 leaves the group of channels, a deflector pair of plates 96 brings upper case and lower case characters to a central point and directs them to a type race 132. The latter is provided with a series of springs such as 134 to keep type against the inside of race 132. A rubber star wheel 154 pushes each piece of type against a spring loaded line follower 150 continuously urged to the left as shown in the figure by a clock spring 156. A friction mechanism schematically shown at 155 allows the clock spring to rotate in a direction shown by the arrow but introduces sufficient friction to prevent it from rotating in the opposite direction atfer the insertion of each type by the star wheel. As the line is being assembled, each piece of type is kept in position by the base plate 148, the top guide plate 146, and the previously assembled line. A pair of contacts 142, FIG. 5, is positioned on a slide 144 at a location depending on the desired length of line or justification measure. These contacts are closed by line follower 150 as soon as the line has the desired length. In addition, as will be explained later, a number of empty spaces are left on the controlling tape or in the controlling circuitry so that a number of recesses on the belt will be empty at the end of each line. In the example shown, on FIG. 17, three unused spaces are left between each line. Accordingly, at the same time as contact 142 is closed, a contact 136 which is kept open as long as pieces of type are in the raceway 132 is also closed thus completing a circuit to send a signal on wire 138 to control the end-of-line function of the machine. The signal appearing on wire 138 controls, through appropriate circuitry, solenoid 164 of FIG. 7 which through lever 176 advances plunger 174 to which is attached a pusher plate 162. This plate is thus moved from position 162 to position 162′, moving with it the latest assembled line 152 to position 152′. Lug 161 of pusher 162 prevents type which may reach the raceway before the end-of-line operation is completed from reaching plate 148. Each line is guided by a fixed plate 170 and an adjustable plate 172 which is located at varying positions depending on the justification desired. As shown in FIG. 6, the previously ejected lines 160 are pushed between a base plate 180 and a top plate 182 against a line follower 184 which can slide on base plate 180 against the friction introduced by a leaf spring 186 attached to the follower and bearing on the base plate 180. A roll of tape is shown at 178. This tape is fed over a roller 188 through the line assembler so that as shown in the figure, as each new line 152 is pushed by pusher 162 against the previously ejected line, the latest assembled line is automatically positioned on top of a fresh section of tape. To insure a better adhesion of lines against the tape surface, the top plate 182 can be spring loaded against the type or periodically oscillated to press slightly the foot of line 160 against the sticky side of the tape.

Figure 18:
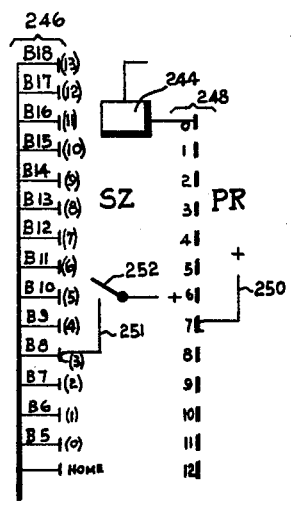
FIG. 18 shows the justification switches.

The justification of lines according to the discrete unit system is automatically achieved by the use of a system similar to the one described in our Patent No. 2,865,270 issued December 23, 1958, and entitled "Photocomposing Apparatus," and our co-pending application Serial No. 531,023, filed August 29, 1955, now abandoned, and entitled "Character Spacing Controls." This patent and patent application refer to photographic type composing machines but it will be evident to one skilled in the art that the same means can be used to perforate a control tape as are used to operate the photographic unit of a type composing machine. Thus, as is well known in the art, all the characters can be measured, setwise, by an integral number of the eighteenth part of the set width of em. For example, the lower case "i" will be five units wide, the lower case "e" eight units, the lower case "m" fifteen units, and so on. In order to justify such a line a computation is made at the keyboard used to prepare the tape controlling the present machine in order to determine the quotient and quotient remainder of the division of the line shortage expressed in units by the number of justifying spaces in the line. This method is described and explained in detail in the aforementioned patent. At the end of the computation, the quotient is stored in a switch SZ and the quotient remainder in a switch PR shown in FIG. 18. If, for example, the line to justify is 41 units short of the justification and comprises 12 justifying spaces during justification computation, the switch SZ will be positioned by moving its brush 251 from its home position one step each time a value equal to the number of justifying spaces, that is to say twelve in the present example is added into the line counter or accumulator of the justification computer. In this example the accumulator will overflow at the fourth addition of the number of justifying spaces. This overflow of the counter stops the adding process and positions a line remainder switch PR at a distance from the zero terminal equal to the difference between the number of justifying spaces in the line and the quotient remainder of the division. Thus in the example shown the quotient switch SZ moves 4 steps from its home position to reach a terminal corresponding to the addition of three units between words and switch PR stops at a position separated from its zero terminal by seven steps. Each time the machine reads from the register or punched tape a signal corresponding to a justifying space, the brush 250 of switch PR moves towards zero by one step. When it reaches the zero terminal it sends a pulse to the motor 244 of switch SZ to move the brush 251 of said switch one step to position 4. As the machine sends a pulse to the recorder each time switch 252, FIG. 18, is closed by the reading of the justifying space code it can be seen that three units will be added to the first seven justifying spaces of the line and four units to the last remaining five spaces giving a total of 41 units. In the present machine a minimum interword space of five units is counted as such during the keyboarding operation and the accumulation of the widths of the individual characters into the counter. This basic minimum width is permanently added by the switch SZ as shown in FIG. 18 so that when the justifying computation calls for the addition of three supplementary units between words a total of three plus five or eight units is actually added between words, nine units for a justifying increment of four additional units, etc. The terminals of switch SZ are connected in the present invention to various channels containing spaces of blank type having a set value of five, six . . . seventeen or eighteen units. It is thus clear that the justification, in the present machine, is preferably obtained by dropping between words blank characters of a width equal to the quotient or quotient plus 1 of the division of the line shortage by the number of justifying spaces contained in the line composed.

Figure 15:
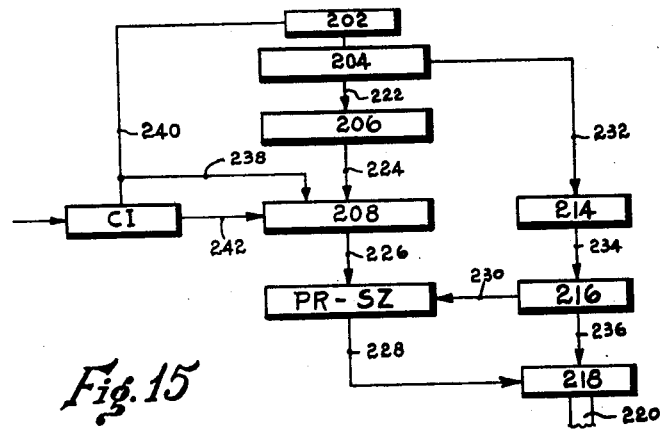
FIG. 15 is a block diagram of a keyboard used for the preparation of a controlling tape.

The tape used to control the machine can be prepared on the keyboard unit shown in FIG. 15. This unit comprises a keyboard 204, preferably an electric typewriter, and a number of elements shown by blocks which all have been described in more detail in the aforementioned patent. From the keyboard 204 emerge seven wires 232 for character identification and 90 wires 222 for character widths. Wires 222 are sent to a style card system 206 which gives to each character a relative width expressed in units, as called for on the particular style used. Five wires 224 expressing the width of individual characters in binary form from four to eighteen units emerge from the card system 206 and are connected to an accumulator 208. The character identity code is sent by wires 232 to a storage 214 which can be of the kind described in our Patent No. 2,690,249 issued September 28, 1954, and entitled "Register for Type Composing Apparatus." Each time space bar 202 is operated, a pulse is sent via wire 240 to a justifying space counter CI. When the line is sufficiently long to be justified the operator presses a carriage return key which starts the justification computation and transfers in the manner explained above the quotient and quotient remainder by wires 226 to stepping switches or equivalent electronic means PR–SZ. As soon as the justification computation is complete, the operator starts typing the next line at the same time as reader 216 transfers the character identity code from storage 214 to a tape punch 218, via a group of seven wires 236. Each time the reader 216 reads a justifying space code a pulse is sent via wire 230 to switches PR and SZ simultaneously in order, as described above, and to energize the selected terminal of switch SZ and to move switch PR one step. The terminal of switch SZ receiving a pulse transfers a code over wires 228 to the tape punch 218. There are as many different codes thus transferred by PR–SZ as there may be different spaces used for justification. In practice it has been found that 14 spaces covering the range from 5 units to 18 units as shown in the figure are sufficient. The tape 220 produced by the typing unit of FIGURE 15 is thus provided with coded information corresponding to the identity of the characters of the line plus coded information corresponding to the spaces or blank characters to be dropped between words in order to justify the line.

The present invention is not limited to the composition of individual pieces of foundry type but can be equally applied to existing line composing machines of the linotype class. As is well known these machines assemble individual matrices which are continuously circulated in the machine. The matrices corresponding to a line of type are ejected from the different channels of a magazine by a mechanism such as the one shown in FIG. 14 comprising a rocker 198, a spring 200, and a pair of plungers 196. In existing machines these matrices are directed from their individual channels to a continuously moving assembling belt by deflection plates. The arrangement is such that it should take the same time for any matrix to reach a common point of assembly. As this time results from the addition of the time it takes for a matrix to fall freely between guide plates plus the time it takes for the belt to transfer it to the assembly point it is clear that any variation might result in transposition of matrices. The long travel through which each matrix has to go introduces a speed limitation as transpositions increase in frequency with speed increase. FIG. 13 shows how the present invention can be incorporated into line-casting machines. The matrices such as 194 are in the same magazines 192 as in existing machines from which they escape by the energization of solenoids 62 shown in FIG. 14. In addition to the matrices used for the letters and signs of the alphabet, we provide matrices such as B15 and B16 of varying thicknesses used to justify the line in the same manner as the one described above. A belt 198 runs continuously in the direction shown and the matrices fall in the proper sequence as controlled by the tape and circuitry of the machine between flaps 202 as shown in FIG. 13. These flaps push the matrices on an assembler rail 206 in cooperation with the star wheel 208 in order to transfer each line of matrices to the line casting part of the machine which may be similar to the one incorporated in existing machines although it may be necessary, because of the higher speed of the present machine, to provide more than one station at which lines can be cast in order to allow time for the metal to solidify before ejecting each line. A plate 204 positioned under the conveyor belt keeps flaps 202 in an erect position ready to receive the matrices as they fall in rapid succession. The justification can also be achieved the usual way by dropping space bands 196 at each interword space rather than fixed blank characters. The escapement of matrices is controlled by exactly the same mechanism as the escapement of individual type and the same description applies to both types of machines.

Mounted on the same shaft as sprockets 200 engaging belt 198 in FIG. 13 and sprockets 87 engaging belt 88 in FIG. 5 are sprockets 201 engaging a belt 199 provided with a number of brushes 214 spaced apart by a distance equal to the distance between the centers of the first and the last character channels plus one "channel space." Brush 214 makes contact with terminals 212 inserted in an insulating board 210 so that, as belt 199 moves, a contact is successively established between brush 214 and this series of terminals, with one terminal associated with each channel, and spaced by the same amount as said channels. The purpose of this arrangement will now be explained in relation to FIGURES 16 and 17.

Figure 16:
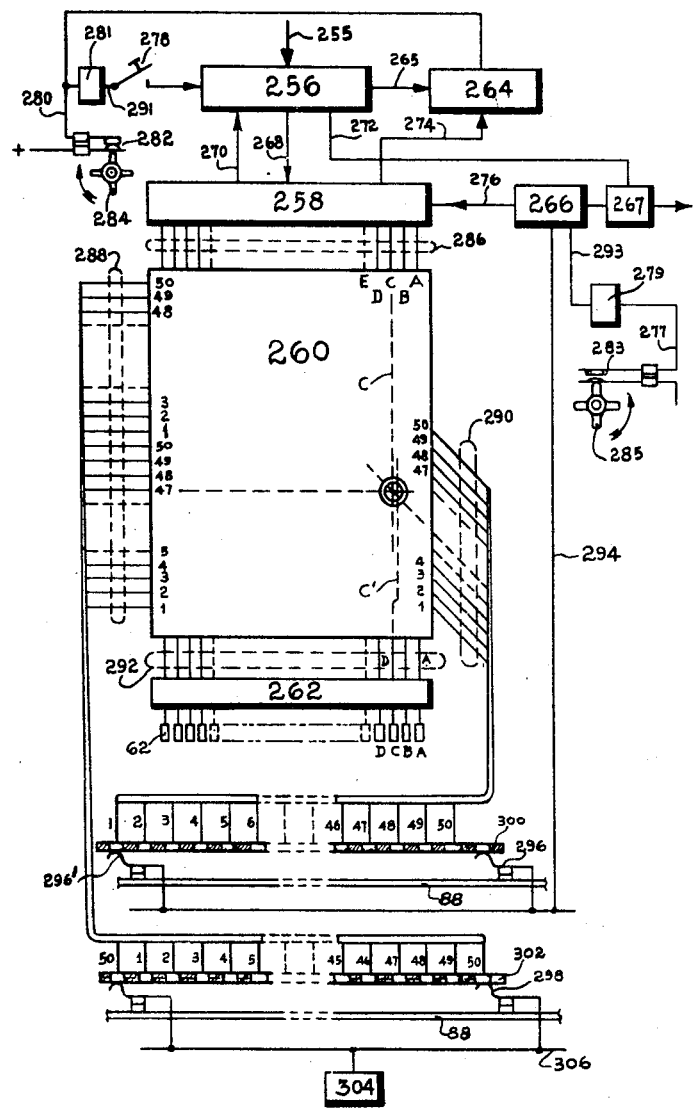
FIG. 16 shows an electronic control circuit.

The perforated tape prepared on the keyboard unit of FIG. 15 is shown at 255 in FIG. 16. This tape is read by a tape reader 256 at the rate, for example, of 30 characters per second. A cam 284 operating contacts 282 sends pulses over wire 280 via circuit 281 and closed control switch 278 to the tape reader advance mechanism. Cam 234 rotates in synchronism with the belt at such a speed that contact 282 is closed each time the belt moves by a distance equal to the distance separating two consecutive channels of type.

The tape reader 256 is connected by a group of wires 268 to a decoder 258. This decoder, as is well known in the art, selects any one wire out of the group 286 having a number of wires equal to the number of various characters and signs of the alphabet plus the blank spaces used for justification purposes plus a number of auxiliary or service signals. Block 260 represents a magnetic core matrix which is shown in more detail in FIG. 17. The input circuit to this core matrix comprises in addition to group of wires 286, a second group of wires 290, for example equal in number to the number of wires 286, or 50 in the present example. There is one magnetic core at each intersection of a wire of "writing" group 286, a wire of "writing" group 290, a wire of "reading" group 288, and a wire of "output" group 292, as shown in the figure. Brushes 296 and 298 mounted on belt 88 move in synchronism with cam 284. At the appropriate time, after a code is read by reader 256 and decoded by decoder 258, a pulse is sent by pulse generator 266 simultaneously on wire 276 and 294 to switch the magnetic core located at the intersection of the wire of group 286 selected by the decoder and the wire of group 290 selected by the terminal with which brush 296 makes contact at the time the pulse is sent. At the same time as a line is stored in the core matrix, information previously stored in said matrix and belonging to another line or to the beginning of the same line is read by sending an appropriate pulse on a wire of group 288 selected by a brush 298 associated with a group of terminals mounted on board 302 and moving in synchronism with brush 296. As shown in the figure, when brush 296 makes contact with its associated terminal 1, brush 298 makes contact with its associated terminal 50, etc., so that as the writing wires 1, 2, 3, 4, 5, 6, etc. of group 290 are selected the reading wire 50, 1, 2, 3, 4, 5, etc. of group 288 are simultaneously selected. The reading pulse sent on wires 288 are always at least one step behind the writing pulse of wires 290 in order to leave at least one step between the writing and reading operation. The system moves thus in a continuous fashion. When a brush such as 296 leaves its associated terminal 50 another brush 296' establishes contact with the first terminal so that the pulses are shifted from wire 50 of group 290 back to wire 1 at the same time as the associated reading pulse goes from the pair of wires 49 of group 288 to wires 50. A pulse generator 304 sends over wire 306 a pulse of the proper shape, direction and intensity at the appropriate time in order to read the cores and generate an output pulse in the selected wire of group 292. As stated above, one or more of these wires can be simultaneously selected to drop one or any number of individual type at their appropriate place on the conveyor belt. Block 262 represents the amplifying circuitry necessary to energize the selected solenoids 62 operating the type ejecting mechanism. There are as many solenoids 62 as there are channels of type. Although two separate systems of brushes 296 and 298 have been shown on the figure it is evident that one system of brush only can be used with the proper element to separate the pulses sent on wires 290 from the pulses sent on wires 288 as the latter wires should receive a pulse of different direction and intensity in order to read the cores which have been switched by the simultaneous application of pulses on a wire of group 290 and a wire group 286.

FIG. 17 shows more in detail the core matrix of block 260 of FIG. 16. The details of the input and output circuits are not shown as they are well known to one skilled in the art. In addition, to facilitate the comprehension of the drawing one vertical wire such as A, B, C is shown rather than the two wires used in the machine such as A' and A one being used to write and the other one to transfer the output to the releasing solenoids through the appropriate amplifying circuitry. There is one core at each intersection of a wire of group 290 with a wire of group 286–292 and a group 288. Suppose, for example, that two lines are going to be composed, the first one being "THIS IS A SAMPLE" and the second one "OF HIGH SPEED." The necessary information concerning character identity and justifying spaces is obtained from the tape by the tape reader 256 of FIG. 16. As soon as switch 278 is closed, pulses are sent to the tape reader to move it forward by steps as explained above. As shown in FIG. 17, the first character read is T and after decoding, a pulse is sent to wire T of group 286 and to one of the slanted wires of group 290, for example wire 1. The core located at the intersection of these two wires is switched by the coincidence of these two pulses. The following character H is likewise stored in the core matrix and so on. All the cores energized after these two lines have been read and decoded are represented by a block dot on FIG. 17. At the same time as write impulses are sent successively to wires 1, 2, 3, 4, and so on of group 290, read impulses are sent on wires 50, 1, 2, 3, 4, etc. of group 288 as explained above. Thus, when character T is stored the reading pulse is on horizontal wire 50, when character H is stored the reading pulse will have moved back to wire 1, and so on. At the tenth pulse, at the same time as slanted writing wire 10 stores a code corresponding to a justifying space, for example 14 units wide, the reading wire 9 of group 288 reads simultaneously the cores on which characters H and A have been stored and causes the escapements corresponding to these two characters to operate and release an H and an A on the belt. The next character to be released is I followed by A followed by I followed by T and E falling simultaneously and so on as explained above. The writing pulses go up on group of wires 290 at the same time as reading pulses go up on group of wires 288. In spite of this it should be pointed out that at no time can any of the slanted wires 290 be energized at the same time as an intersecting horizontal wire 288. The arrangement shown is such that any length of line can be composed. If, for example, the line to compose comprises more than 50 characters, the characters following the 50th character of said line will be stored at the same time as the last previously stored 50 characters are read and also at the same time as the latest stored characters beyond the 50's are also read.

Figures 9, 10:
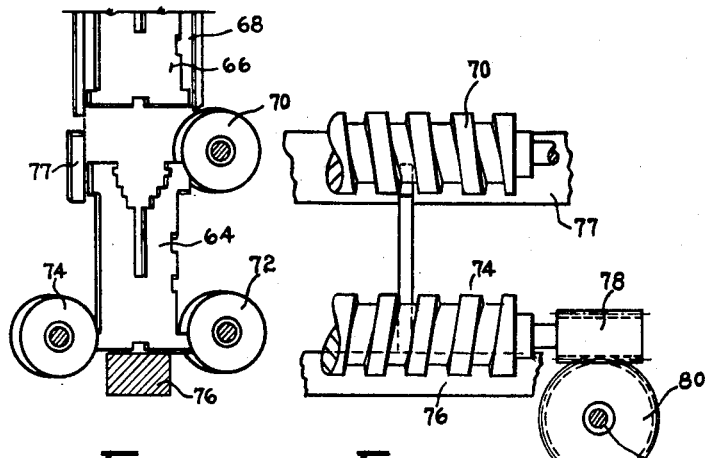
FIGS. 9 and 10 show an alternative means for the assembly of matrices.

The end-of-line signals can be sent to a circuit receiving also a pulse from wire 138 of FIG. 9 in order to detect any erroneous operation of the machine which would send an end-of-line signal at a time where no signal appears on wire 138. The speed of the machine depends on the speed at which each character can be ejected from its strip or channel. As it generally takes as long for a solenoid to release as to operate, it is evident that the average speed can be increased by taking into account the operating time only of the escapement solenoids such as 62. The only time where the release time of these solenoids should be taken into account is when two or more characters have to be consecutively ejected. In this case, according to a characteristic of the invention, an empty space is left between successive characters which will have no affect on the lengths of line. The purpose of this system is to leave twice as long to the solenoids to operate for succeeding identical characters as they have to operate in normal conditions.

FIG. 22 shows more in detail the circuitry schematically represented on FIG. 16, the purpose of which is to skip a position on the conveyor belt between two succeeding identical characters or more. Although in the example of FIG. 22 relays and stepping switches are shown, it is evident that any equivalent circuitry using any kind of bistable elements can be used, such as electronic flip-flops and gates. In the example shown, it is assumed that tape 255 of FIG. 16, contains seven binary stages for the identification of the various characters used in the composition of lines. In this case, seven high speed relays can be used to implement box 264, of FIG. 16 the contacts of which are shown at 380 of FIG. 22. It is also assumed in the present example that box 258 of FIG. 16 represents a relay type decoder, seven contacts associated with the relays being shown at 382. Each of the contacts such as 384 shown in FIG. 22 is, of course, associated with a different relay coil. The relay coils are not shown in the figure but it is assumed that, as shown, the contacts are in their deenergized position. As explained above and as described in our Patent 2,856,270 the tape reader transfers the coded information relative to one character to relays of box 258 corresponding to contacts 382 which lock themselves and allow the tape reader to move to the next character of the line while the information concerning the previous character is still stored in relays 258. It is only after the magnetic core corresponding to the code stored in box 258 has been switched that these relays pick up the information presented to them by the reader while the tape moves to the next character. The relays of group 264 having contact 380 on the contrary, are immediately energized by the tape reader so that when relays 258 are positioned to represent the code of a given character these relays of box 264 have already been energized to represent the following character of the line. As shown in FIG. 22, the group of contacts of relays 258 shown at 382 and the group of contacts of relays 264 shown at 380 are wired in such a way that when both groups of relays represent the same code the pulse sent over wire 280 is allowed to go through the circuitry comprising the contacts of these relays and interconnecting wires as shown and reach, at the output of this network, wire 388 which directs this pulse to the motor magnet 390 of a stepping switch 400. The pulse introduced into the network by wire 280 emerges on wire 388 when the character which has been stored in relays 258 is the same as the character represented by relays 264. As shown, the stepping switch 400 comprises three rows of terminals with associated brushes. When it is at rest, the pulses of wire 280 are directed by row 281, to wire 291, and to the tape feed mechanism through a manual switch 278 as shown on FIG. 16. Row of terminals 279 is connected by wire 293 to the writing pulse generating circuitry 266 controlled by a cam 285 (FIG. 16) rotating in synchronism with the conveyor belt and operating a contact 283 to send controlling pulses via wire 277 to the writing pulse generator 266. As shown in FIG. 22, when it is at its rest position, stepping switch 400 allows the pulses appearing on wire 277 to reach wire 293 via bank 279. The first pulse appearing on wire 388 moves stepping switch 400 one step as shown in the figure, which disconnects simultaneously the tape feed wire 291 from the tape mechanism and pulse control wire 293 from the writing circuitry. The stepping switch 400 moves another step for the next pulse appearing on wire 280 via the circuits closed by brush 402 to move to the next position in which the connections are returned to normal as shown in the figure. The final result of this sequence of operations is to have lost one of the pulses sent by cams 284 and 285 during which time the conveyor belt has moved one step, thus leaving one unused space between two consecutive identical characters. This procedure makes the releasing time of the character escapement solenoids of no importance as long as it is less than the operating time and the average speed of the machine can be considerably increased in spite of the fact that some loss occurs because it takes longer to set two consecutive identical characters.

Although the core matrix of FIG. 17 shows no more than 50 characters in the alphabet, it is evident that the same system can be used for more characters per alphabet or more alphabets. In a preferred embodiment two arrays such as the ones shown in FIG. 17 are used. One is associated with the lower case characters contained in a group of channels on one side of the conveyor belt and another array, similar to the first one, is associated with the upper case characters located on the other side of the conveyor belt as shown in FIG. 4. The selection of one array or the other array can be made by a pulse sent over wire 272 FIG. 16, generated by a shift code or the seventh hold of the character identity tape. The pulse received by wire 272 can, for example, close gate 267 preventing thereby the writing of characters on the upper case matrix 260 and opening at the same time a similar gate controlling the lower case core matrix.

Figure 19:
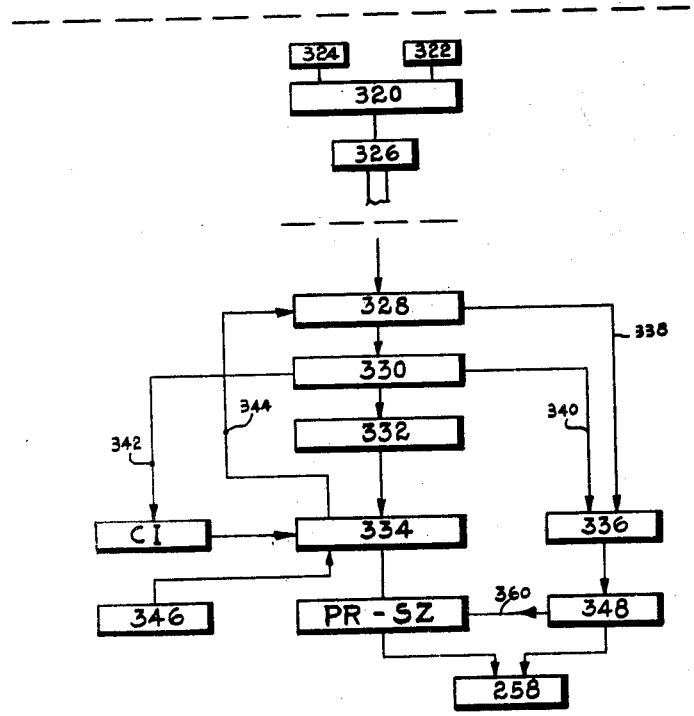
FIG. 19 is a block diagram relating to an alternative way to feed information into the machine.

FIG. 19 shows a modified arrangement of the control circuitry of the machine. In this arrangement a separate keyboard produces a tape containing no information about the character widths or the justification of the line. This system makes it possible to use simple tape perforating typewriters for keyboards reducing the price of these keyboards which is important, as, because of the high speed of the machine, up to ten keyboards may be necessary to produce tape to keep one composing unit in continuous operation. In the figure, box 320 represents an electric typewriter provided with permutation bars or an encoding circuit to send in binary form the alphabetical code of each character to a tape perforator shown at 326. Three twenty-two represents the space bar of the typewriter and 324 represents a special key called "discretionary hyphen" key which is depressed by the operator each time a long word is typed which may require hyphenation. The operator pays no attention as to the justification measure or length of line he is composing but operates this key 324 to introduce a discretionary hyphen code whenever a word containing more than 6 or 8 characters is composed, and at the appropriate location to conform to grammatical rules. The tape thus obtained contains for example perforations on seven channels representing all the characters used in the composition of lines plus the discretionary hyphen code, plus a special code introduced at the end of paragraphs. The blocks located below the dotted line of FIG. 19 are actually part of the composing unit and comprise a tape reader 328 to receive the tape produced by the keyboard, a decoder 330 from which emerge one wire per character, a widths card unit 332 to assign to each character a relative width in binary form an accumulator 334, a justifying spaces counter CI, justification switches PR-SZ, a first magnetic core memory 336, its reader 348 and finally a decoder 258 identical to the one shown on FIG. 16 which is followed by the same elements as the ones shown in said FIG. 16. The alphabetical code of each character is transferred by the tape reader 328 via wire 338 to storage 336 which receives also, via wire 340, a special code for each justifying space. Box 346 represents a manually operated length of line adjustment which may comprise a number of push buttons. The purpose of this box 346 is to pre-set the accumulator 334 by a value equal to the full capacity of said accumulator minus the length of line desired as has been explained in the above-mentioned patent and patent application. The justification computation proceeds in the same manner as has been explained above except that electronic components rather than relays are used in order to expedite said computation. The tape is moved through reader 328 at a high speed and as each row of perforations is read and decoded, the widths of the corresponding character is added to the accumulator until said accumulator has reached a predetermined value short by a relatively small number of units, for example 50, from its full capacity. At this time a pulse is sent by the accumulator to the tape reader via wire 344 to stop the reader at the next justifying space code or discretionary hyphen code. As soon as one of these codes is read, the reader stops and the justification computation takes place. The results are stored in switches PR-SZ which in this case are preferably two groups of electronic flip-flops. As soon as the computation is made the reader 348 transfers the alphabetical information concerning the characters from storage 336 to decoder 258 and each time it reads the code corresponding to a justifying space, a pulse is sent over wire 360 to the group of switches PR-SZ in order to transfer to decoder 258 the binary code corresponding to the space or blank character of the appropriate width value to justify the line.

FIG. 8 shows schematically a system preferably used in the machine to keep it in continuous operation by avoiding stoppages due to the exhaustion of coils of characters. As shown in FIG. 8 two coils 360 and 362 are preferably supplied for each character used in the machine. A pair of feed rollers 364 is associated with coil 362. These feed rollers operate in the same manner as previously described and have a tendency to push each strip of type to the right as shown in the figure. In the figure it is coil 362 which feeds the character through the channel 368 while a switch plate 370 pivoted at 374 prevents the strip from coil 362 to reach channel 368. It is clear that as soon as the coil 360 will be completely exhausted and its last character will have gone by the switch plate 370, the latter will switch and allow the strip from coil 362 to reach the channel 368 and feed the machine. The last character of each strip has preferably a sticky back in order to be kept in position by the first character of the new strip. As the operator replaces each coil as soon as it is exhausted, the machine, by the use of the system shown, can be kept in continuous operation.

Figure 11:
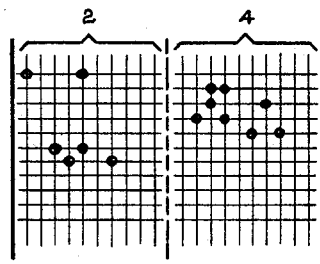
FIGS. 11 and 12 represent portions of a form of the control perforated tape.
Figure 12:
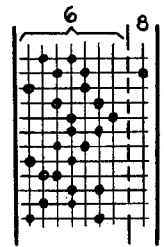

In another embodiment of the invention, the core matrix system is replaced by a wide punched tape and multiple brushes as shown in FIGS. 11, 12, 20, and 21. A wide tape similar to the one used in Monotype composing machines is preferably used in this embodiment. In the example shown, never more nor less than two holes are used to identify one given character or a channel of a group of magazines. In FIG. 11 the section 2 of the tape is used for lower case characters and section 4 is used for upper case characters. In this case, upper case and lower case characters have a complete code. In FIG. 12, the channel 6 of the tape receives the identity of the characters in the form of two holes for each character, and channel 8 receives one shift perforation to identify upper case characters. Other levels can be added to represent roman, italic, bold and small caps each energizing a special shift circuit in a manner well known to one skilled in the art. The tape shown in FIG. 12 can comprise ten levels in section 6 which would permit a maximum number of two-hole combinations of 55. With one hole in section 8 for upper case characters, this tape can be used to identify a total of 110 characters, which is sufficient in most cases. The tape shown may contain no information corresponding to the justification of lines if it is used to control a linecasting machine in which the justification is obtained by the usual operation of space bands. It can be prepared on a tape punching typewriter comprising counting means in order to permit the operator to break the lines in such a way that they can be justified by the machine.

Figure 20:
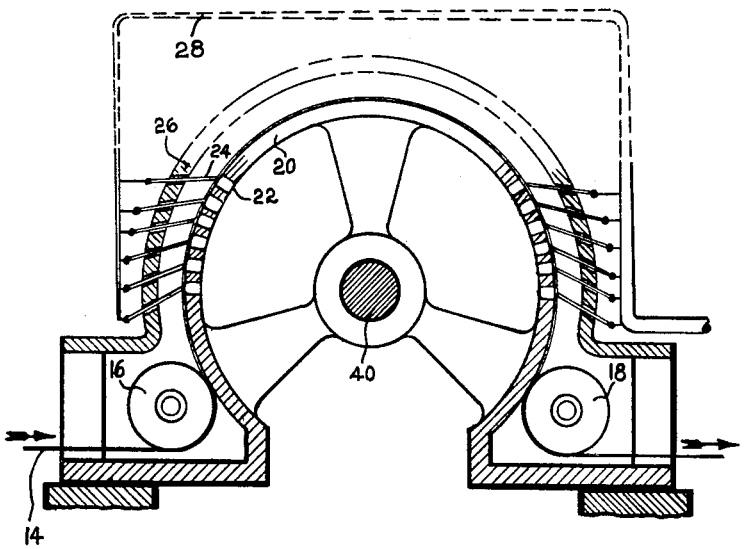
FIGS. 20 and 21 show an alternative to the electronic control for type or matrix distribution.
Figure 21:
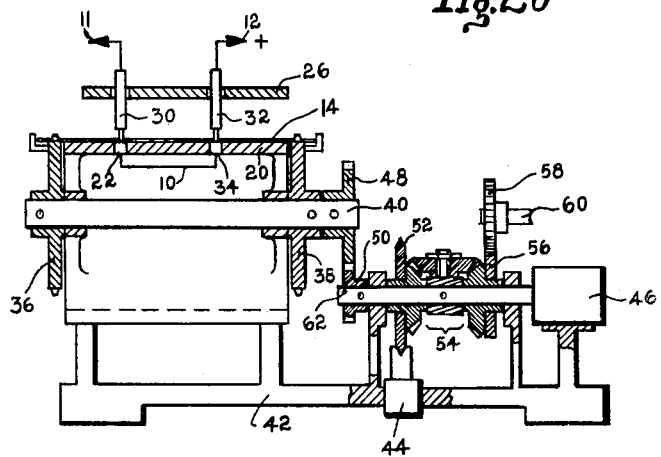

As shown in FIGS. 20 and 21 the tape 14 is fed from roller 16, over sprockets 36 and 38, to roller 18 and to a tape winding mechanism now shown. The sprockets 36 and 38 are pinned to a shaft 40 rotating in the center of a stationary drum of insulating material 20. Concentric with drum 20 is a stationary concentric cylindrical sector 26 made also of insulating material and provided with as many pairs of brushes 24 on its periphery as there are channels of different characters in the machine. These brushes are pressing against the paper tape and can make contact through holes in said paper tape with conducting terminals 22 inserted in the insulating portion of drum 20. As shown in FIG. 21 for each group of brushes there will be one combination and one combination only of holes of the tape which will allow the current to pass from wire 12 to wire 11 and from said wire to the escapement solenoid corresponding to the channel to which this particular combination has been assigned. Each pair of terminals such as 22 and 24 are connected by a wire such as 10. Several such circuits can be simultaneously closed during the operation of the machine causing the simultaneous ejection of different type or matrices on different sections of the conveyor belt. The shaft 40 is driven by shaft 60, pinion 58, pinion 56, differential 54, and pinions 50 and 48. The differential shaft 62 is connected to a friction mechanism 46 which allows the shaft to rotate against a constant friction. An escapement wheel 52 is attached to one of the sun gears of the differential and is normally prevented from rotation by a solenoid-controlled escapement 54.

The purpose of this differential is to "lose" one step each time a repeat character is read by the tape.

Through a circuit similar to the one described above, each time a character is repeated in a word, the solenoid 44 is energized which allows the wheel 52 to escape one tooth during which time, because of friction mechanism 46, the shaft 62 remains stationary in spite of the continuous rotation of shaft 50. During this operation the tape is not moved and extra time is thus allowed for the return of the escapement solenoid of the character to repeat.

FIGS. 9 and 10 show an alternative to the assembly mechanism shown on FIG. 13 for the application of the invention to linecasting machines. As shown in these figures, the same screw arrangement as is incorporated in the distribution mechanism of existing linecasting machines are used in a modified form in this embodiment. The matrices such as 66 are retained in their channels 68 in the conventional way. Under the channel assembly of the machine, extend three screws 70, 72, and 74 located as shown in FIG. 9 so that when a matrix is released from the channel it falls by gravity between screw 70 and retaining plate 77 and the pair of screws 72-74 to rest on rail 76. Each matrix is thus held in position in the threads of the screws and is gradually pushed to the line assembly mechanism in the same way, as in existing linecasting machines, a line of matrices following the casting of said line is moved in front of the magazine apertures to return to their individual channels. A worm gear arrangement 78 and 80 control the rotation of a shaft 60 mechanically connected to the tape feeding mechanism shown in FIG. 21 in order to maintain perfect synchronism between the matrix translating screws and the control tape.

Although the invention has been described in terms of several embodiments, it will be appreciated that these embodiments are susceptible of numerous modifications and that either embodiments are possible within the spirit and scope of the invention. Therefore, the invention should not be deemed to be limited to the details of what has been described herein by way of example, but rather it should be deemed to be limited only by the scope of what is claimed.

We claim:

1. Apparatus for composing a line of type, said apparatus comprising a plurality of character-bearing elements reresenting the characters in the line of type, storage means to retain said character-bearing elements at ordered locations according to the identity of the characters represented thereby, means to select character-bearing elements according to the identity of the characters in the line of type for release from said storage means and including memory means for a line of text, conveyor means to receive the character-bearing elements released from said storage means, said conveyor means describing a path which bears a fixed relation in space to the locus of said storage means, and means to cause said character-bearing elements to be released from said storage means in a sequence determined by the order of the characters in the line and the order of the arrangement of different character-bearing elements at said locations in relation to said path.

2. Type composing apparatus as claimed in claim 1 wherein said conveyor means comprises an endless belt conveyor and said storage means comprises two lines of dispensing devices disposed along opposite sides of the belt.

3. Type composing apparatus as claimed in claim 2 including strips of material for detachably mounting groups of like character-bearing elements in side-by-side alignment and wherein said dispensing devices include means for retaining said strips in the form of coils.

4. Type composing apparatus as claimed in claim 3 wherein each dispensing device has two coils of character-bearing elements associated therewith and includes means to advance one of said coils selectively for release of character-bearing elements from the device when the other coil is exhausted.

5. Type composing apparatus as claimed in claim 4 including solenoid controlled escapement mechanisms to cause release of character-bearing elements from the dispensing devices.

6. Apparatus for composing a line of type, said apparatus comprising a plurality of character-bearing elements representing the characters in the line of type, storage means to retain said character-bearing elements at ordered locations according to the identity of the characters represented thereby, means to select character-bearing elements according to the identity of the characters in the line of type for release from said storage means and including memory means for a line of text, conveyor means traversing said locations to receive the character-bearing elements released from said storage means, said character-bearing elements being selected in timed relation to the travel of said conveyor means, and means to cause said character-bearing elements to be released from said storage means in a sequence determined by the order of said character-bearing elements at said locations and by the travel of said conveyor means with respect to said locations.

7. Apparatus for composing a line of type, said apparatus comprising a plurality of character-bearing elements representing the characters in the line of type, a plurality of element dispensing devices disposed in a line and storing groups of corresponding character-bearing elements according to their identity, a record medium carrying indicia for a line of text to specify character-bearing elements according to the order of occurrence of the corresponding characters in the line of type, means to derive signals designated character-bearing elements from said record medium, means for selecting character-bearing elements in response to said signals for release from said dispensing devices, a belt conveyor traversing the line of said dispensing devices to receive the character-bearing elements released from said dispensing devices, and means to cause such character-bearing elements to be released from said dispensing devices in a sequence determined by the order of the characters in the line of type and by the order of the arrangement of different character-bearing elements at said locations in relation to said path.

8. Apparatus for composing a line of type, said apparatus comprising a plurality of character-bearing elements representing the characters in the line of type, a plurality of element dispensing devices disposed in a line and storing groups of corresponding character-bearing elements according to their identity, a tape carrying indicia of character-bearing elements for a line of text in the order of occurrence of the corresponding characters in the line of type, a belt conveyor traversing the line of said dispensing devices to receive the character-bearing elements released from the devices, transport means to advance the tape in synchronism with the travel of the belt, tape reading means disposed at a fixed station with respect to the tape for deriving signals representing the character-bearing elements, means for selecting character-bearing elements in response to said signals for release from said dispensing devices, and means to cause said character-bearing elements to be released from the dispensing devices in a sequence determined by the order of the character-bearing elements in the line of the devices and the travel of said conveyor with respect to said devices.

9. Apparatus for composing a line of type, said apparatus comprising a plurality of character-bearing elements representing the characters in the line of type, storage means to retain said character-bearing elements at ordered locations according to the identity of the characters represented thereby, means to provide signals designating characters according to their order of occurrence in the line of type, a magnetic core memory to translate said first-named signals into signals designating character-bearing elements in a sequence determined by the order of the corresponding characters in the line of type and the order of the character-bearing elements at said locations, means to release the selected character-bearing elements from said magazines in response to said second-named signals, and conveyor means to receive the character-bearing elements released from said storage means, said conveyor means describing a path which bears a fixed relation in space to the locus of said storage means.

10. Apparatus for composing a line of type, said apparatus comprising a plurality of character-bearing elements representing the characters in the line of type, storage means to retain said character-bearing elements at ordered locations according to the identity of the characters represented thereby, a magnetic core memory, means to select cores for the storage of signals designating character-bearing elements in accordance with the order of the characters represented at said storage locations and the order of the characters in the line of type, means to sense the cores in said memory in a predetermined sequence thereby to read out the signals designating character-bearing elements, means to release character-bearing elements from said storage means in response to said signals designating character-bearing elements, and conveyor means to receive the character-bearing elements released from said storage means, said conveyor means describing a path which bears a fixed relation in space to the locus of said storage means.

11. Apparatus for composing a line of type, said apparatus comprising a plurality of character-bearing elements representing the characters in the line of type, storage means to retain said character-bearing elements at ordered locations according to the identity of the characters represented thereby, conveyor means traversing said locations to receive character-bearing elements released from said storage means, means to provide signals designating characters according to their order of occurrence in the line of type, a magnetic core memory to translate said first-named signals into signals designating character-bearing elements in a sequence determined by the order of said character-bearing elements at said locations and by the travel of said conveyor means with respect to said locations, and means to release said character-bearing elements from said magazines in response to said second-named signals.

12. Apparatus for composing a line of type, said apparatus comprising a plurality of character-bearing elements representing the characters in the line of type, a plurality of element dispensing devices disposed in a line and storing groups of corresponding character-bearing elements according to their identity, a record medium carrying indicia to specify characters according to their order of occurrence in the line of type, means to derive signals designating characters from said record medium, means to provide signals indicative of the order of the characters in the line of type, a magnetic core memory, means to select cores for the storage of signals designating character-bearing elements in response to said signals designating characters and signals indicative of the order of the characters in the line of type, means to sense the cores in said memory in a predetermined sequence thereby to read out said stored signals designating character-bearing elements, means to release character-bearing elements from said dispensing devices in response to said stored signals, and a belt conveyor traversing the line of said dispensing devices to receive the character-bearing elements released therefrom.

13. Apparatus for composing a line of type, said apparatus comprising a plurality of character-bearing elements representing the characters in the line of type, a plurality of element dispensing devices disposed in a line and storing groups of corresponding character-bearing elements according to their identity, a tape carrying indicia of characters in the order of their occurrence in the line of type, a belt conveyor traversing the line of said dispensing devices to receive character-bearing elements released therefrom, transport means to advance the tape in synchronism with the travel of the belt, tape reading means disposed at a fixed station with respect to the tape for deriving signals representing the characters, a magnetic core memory to translate said first-named signals designating characters into signals designating character bearing elements in sequence determined by the order of said character-bearing elements in said magazines and the travel of the belt with respect to said dispensing devices, and means to release character-bearing elements from said dispensing devices in response to said second-named signals.

14. Apparatus for composing a line of type, said apparatus comprising a plurality of character-bearing elements representing the characters in the line of type, a plurality of element dispensing devices disposed in a line and storing groups of corresponding character-bearing elements according to their identity, a tape carrying indicia of characters in the order of their occurrence in the line of type, a belt conveyor traversing the line of said dispensing devices to receive character-bearing elements released therefrom means to provide signals indicative of the travel of the belt with respect to said dispensing devices, transport means to advance the tape in synchronism with the travel of the belt, tape reading means disposed at a fixed station with respect to the tape for deriving signals representing characters, a magnetic core memory, means to select cores for the storage of signals designating character bearing elements in accordance with said signals designating characters and signals indicative of the travel of the belt with respect to said dispensing devices, means to sense the cores in said memory in a predetermined sequence thereby to read out said stored signals, and means to release said character bearing elements from said dispensing devices in response to said stored signals.

15. Apparatus for composing a line of character-bearing elements comprising, in combination, a plurality of character-bearing elements to be selected, receiving means to receive the elements, storage means to retain the elements, such storage means having means to store information corresponding to a line of text and to release the elements on to said receiving means in mutually-displaced relation to a predetermined path, means to move the receiving means and storage means relatively in the direction of said path, and means to cause release of each said element on to said receiving means at a moment defined by the order of said element in the selected line and the order of the storage means for said elements along path.

16. Type composing apparatus having, in combination, a support for a number of rows of character matrices arranged in a predetermined consecutive order, a matrix-receptive member upon which selected matrices are to be distributed in consecutive positions corresponding to the order of the characters represented thereby in a line of type, means to support the matrix-receptive member in juxtaposed relation to the rows of matrices, matrix release means for each row of matrices operable to release a matrix to the position on the matrix-receptive member in a corresponding predetermined relation to said row, means to move the matrix-receptive member to cause every position thereon to pass consecutively into said predetermined relation with each of the rows of matrices successively, memory means for a line of text, and means controlled by the memory means to operate the matrix release means in a predetermined timed sequence.

17. Apparatus for composing a line of type, said apparatus comprising a plurality of character-bearing elements representing the characters in the line of type, storage means to retain said character-bearing elements at ordered locations according to the identity of the characters represented thereby, means to select character-bearing elements according to the identity of the characters in the line of type for release from said storage means, conveyor means traversing said locations to receive the character-bearing elements released from said storage means, said character-bearing elements being selected in timed relation to the travel of said conveyor means, and means to cause said character-bearing elements to be released from said storage means in a sequence determined by the order of said character-bearing elements at said locations and by the travel of said conveyor means with respect to said locations, said means to cause release including means responsive to successive characters of like identity in the line of type for increasing the time interval between the release of successive character bearing elements in said sequence corresponding to said successive characters of like identity.

18. The method of type composition which consists of supporting rows of type matrices in a predetermined consecutive order, causing a matrix-receptive member upon which selected matrices are to be distributed to form a line of text to move in relation to said rows so that different rows are simultaneously juxtaposed to different positions thereon, and so that any given position thereon passes consecutively into juxtaposed relation to all of said rows consecutively, storing information corresponding to a line of text, retrieving said information in a timed relation dependent upon the position in said order of the row of each selected matrix and upon the order of each appearance of said matrix in said line, and releasing said selected matrices from each individual row to the position of the matrix-receptive member momentarily juxtaposed thereto in a predetermined time sequence corresponding to said timed relation whereby said selected matrices are released in a sequence different from the sequence in which said selected matrices are read in the completed line.

19. The method of type composition which consists of supporting rows of type matrices in a predetermined order, causing a support for the matrices to move in parallel relation to the rows of matrices, storing information corresponding to a line of text, retrieving said information in a timed relation dependent upon the position in said order of the row of each selected matrix and upon the order of each appearance of said matrix in said line, and releasing said selected matrices from said rows on to the moving support at predetermined time intervals measured from an instant representing a given relationship of the support to the rows of matrices and corresponding to said timed relation whereby said selected matrices are released in a sequence different from the sequence in which said selected matrices are read in the completed line.

20. The method of type composition which consists of supporting rows of type matrices in a predetermined order, causing a support for the matrices to move in parallel relation to the rows of matrices, storing information corresponding to a line of text, retrieving said information in a timed relation dependent upon the position in said order of the row of each selected matrix and upon the order of each appearance of said matrix in said line, and releasing said selected matrices from said rows on to the moving support, each selected matrix being released after a predetermined time interval from an instant representing a given relationship of the support to the rows of matrices, said interval being proportional to said timed relation whereby said selected matrices are released in a sequence different from the sequence in which said selected matrices are read in the completed line.

21. The method of type composition which consists of supporting in a predetermined order a number of rows of type matrices, each row having like typographical character matrices and differing rows having differing character matrices, causing a matrix-receptive member to move in a parallel relation to said rows of matrices, storing information corresponding to a line of text, retrieving said information in a timed relation and releasing selected matrices from said rows to the matrix-receptive member in a predetermined order proportional to said timed relation, said relation being derived by assigning to each character in said line of text a number determined by the sum of its order of appearance in said line to text and the order in which its corresponding row of matrices is passed by a given position on the matrix-receptive member, the release of said selected matrices occurring at time intervals proportional to the numbers so assigned thereto whereby said selected matrices are released in a sequence different from the order in which said selected matrices are read in the completed line.

References Cited in the file of this patent
UNITED STATES PATENTS

| | | |
|---|---|---|
| 578,828 | Millan | Mar. 16, 1897 |
| 1,188,762 | Hansen | June 27, 1916 |
| 1,679,317 | Marlatt | July 31, 1928 |
| 2,002,516 | Ackerman | May 28, 1935 |
| 2,091,286 | Krum et al. | Aug. 31, 1937 |